(12) United States Patent
Koskey, Jr.

(10) Patent No.: US 7,755,007 B2
(45) Date of Patent: Jul. 13, 2010

(54) HEATED PET MAT

(75) Inventor: James Donald Koskey, Jr., Manitou Springs, CO (US)

(73) Assignee: K&H Manufacturing, Inc, Colorado Springs, CO (US)

( * ) Notice: Subject to any disclaimer, the term of this patent is extended or adjusted under 35 U.S.C. 154(b) by 831 days.

(21) Appl. No.: 10/825,639

(22) Filed: Apr. 15, 2004

(65) Prior Publication Data

US 2005/0016993 A1    Jan. 27, 2005

Related U.S. Application Data

(60) Provisional application No. 60/463,705, filed on Apr. 17, 2003.

(51) Int. Cl.
*H05B 3/02* (2006.01)
*A01K 29/00* (2006.01)

(52) U.S. Cl. .................. 219/546; 119/28.5

(58) Field of Classification Search .......... 219/217, 219/528, 546, 345, 213, 212; 119/28.5
See application file for complete search history.

(56) References Cited

U.S. PATENT DOCUMENTS

| | | | | |
|---|---|---|---|---|
| 2,612,585 A | * | 9/1952 | McCann | 392/435 |
| 4,429,216 A | * | 1/1984 | Brigham | 219/528 |
| 4,788,417 A | * | 11/1988 | Graflind | 219/528 |
| 5,229,581 A | * | 7/1993 | Boulet d'Auria | 219/535 |
| 5,371,340 A | * | 12/1994 | Stanfield | 219/217 |
| 5,685,257 A | * | 11/1997 | Feibus | 119/28.5 |
| 5,814,175 A | * | 9/1998 | Rau et al. | 156/157 |
| 6,044,794 A | * | 4/2000 | Raitanen et al. | 119/28.5 |
| 6,256,818 B1 | * | 7/2001 | Hughes | 5/639 |
| 2004/0195227 A1 | * | 10/2004 | Park | 219/217 |

OTHER PUBLICATIONS

Derwent-ACC-No. 1990-370201 Electro-Fusion coupling elements.*

* cited by examiner

*Primary Examiner*—Daniel Robinson
(74) *Attorney, Agent, or Firm*—Dale B Halling

(57) ABSTRACT

A heated pet mat has a fire retardant covering in the shape of a truncated circle folded in half to form two layers. A resistive heating element is sandwiched between the two layers.

5 Claims, 2 Drawing Sheets

HEATED PET MAT

RELATED APPLICATIONS

The present invention claims priority on provisional patent application Ser. No. 60/463,705, filed on Apr., 17 2003, entitled "Heated Dog Mat".

FIELD OF THE INVENTION

The present invention relates generally to the field of pet products and more particularly to a heated pet mat.

BACKGROUND OF THE INVENTION

In recent years round or igloo shaped doghouses have become the most commonly sold doghouses. Unfortunately, the heated pet mats for rectangular doghouses do not fit in these round doghouses. As a result, there has been a need for a heated pet mat that fits in the new round dog houses. Attempts to make round or semicircular heated pet mats have not worked, because of the costs of the waste associated with this shape. A rectangular pad is capable of having almost no waste when the plastic cover is cut from a sheet of plastic. Unfortunately there is significant waste when cutting a circle or pair of semicircles from a sheet of plastic. In fact the unusable plastic sheet is over 20% of the total plastic area. This has resulted in pricing round or semicircular heated pet mats out of the market.

Thus there exists a need for a heated pet mat that can be made economically.

SUMMARY OF INVENTION

A heated pet mat that overcomes these and other problems has a fire retardant covering in the shape of a truncated circle folded in half to form two layers. A resistive heating element is sandwiched between the two layers. The two layers are sealed along an edge. The fire retardant covering may be made of acrylonitrile butadien styrene plastic. The fire retardant covering may be made of polyvinyl chloride. The two layers may be sealed by welding the two layers together. The truncated circle may ave a width that is 10% shorter than a radius.

In one embodiment, a heated pat mat has a housing in the shape of a truncated semicircle. A heating element is contained within the housing. In one embodiment, the housing is formed of two layers of fire retardant plastic. The two layers of plastic may be made of acrylonitrile butadien styrene plastic. The heating element may include a resistive heat wire. The heating element may include a transfer foil.

In one embodiment, a heated pet mat has a first layer of fire retardant plastic in the shape of a truncated semicircle. A first transfer foil has approximately a same shape as the first layer of fire retardant plastic and is adjacent to the first layer of fire retardant plastic. A layer of heating wire is adjacent to the first transfer foil. A second transfer foil has approximately the same shape as the first layer of fire retardant plastic and is adjacent to the layer of heating wire. A second layer of fire retardant plastic has approximately the same shape as the first layer of fire retardant plastic and is sealed along an edge to the first layer of fire retardant plastic and second layer of fire retardant plastic.

DETAILED DESCRIPTION OF THE DRAWINGS

Figure 1:
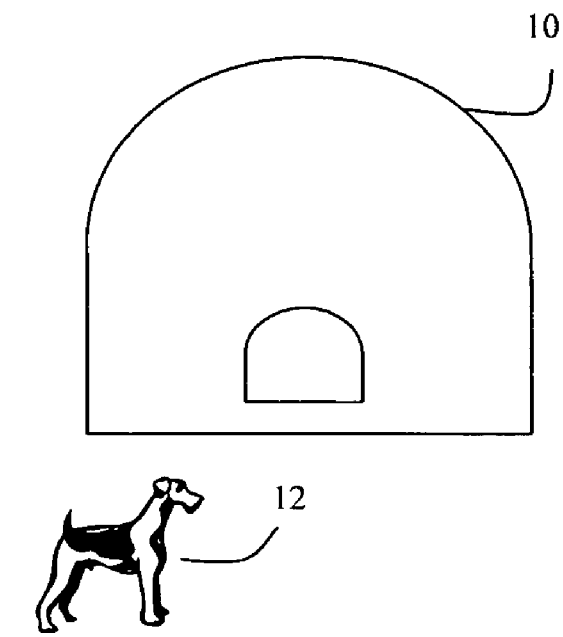
FIG. 1 is a cartoon drawing of a round doghouse capable of using the invention.

The heated pet mat described herein allows heated pet mats to be made economically for round pet enclosures. FIG. 1 is a cartoon drawing of a round doghouse 10 capable of using the invention. A dog 12 is shown next to the round doghouse 10. In the winter the dog 12 requires some form of heat source in the doghouse 10 to avoid exposure and to be comfortable.

Figure 2:
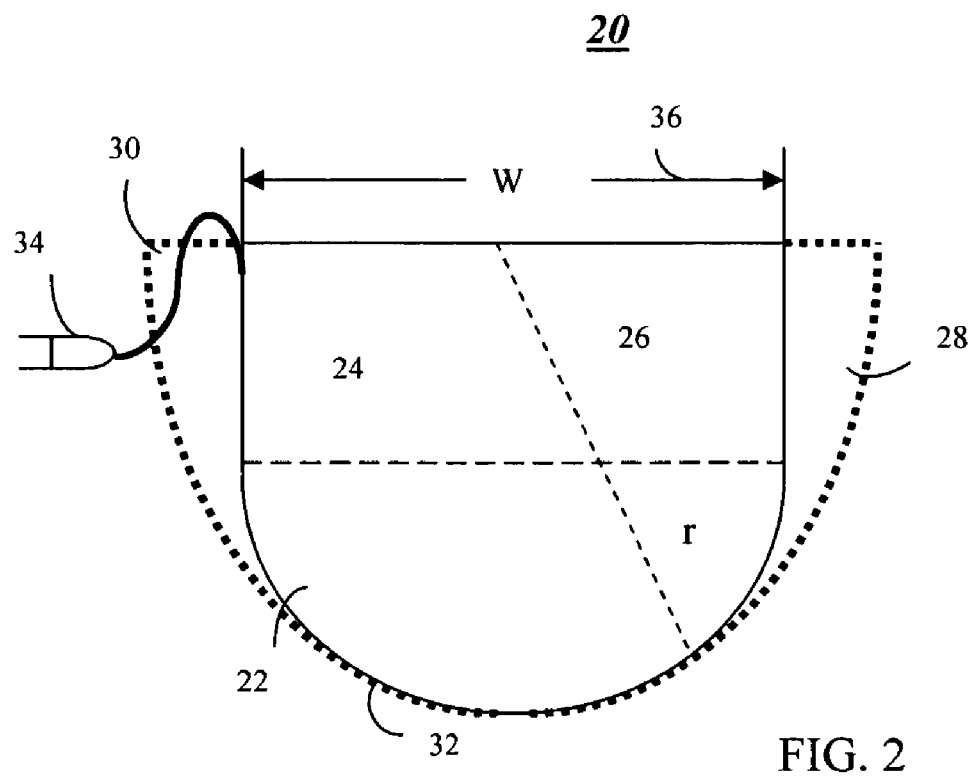
FIG. 2 is a top view of a heated pet mat in accordance with one embodiment of the invention.

FIG. 2 is a top view of a heated pet mat 20 in accordance with one embodiment of the invention. The heated pet mat 20 has covering 22 that is in the form of a truncated semicircle. The truncated semicircle is a semicircle 24 having a radius 26. The ends 28 and 30 of the semicircle shown in dashed lines have been removed from the semicircle 24. Note that it would be possible to use a semicircle on top of a rectangle, but this would increase the amount of wasted covering material. This shape fits easily in the round doghouse 10 and in fact is easier to place in a round doghouse than a true semicircular or circular mat. The dog is unlikely to be laying on the cutout areas 28 & 30 and therefore the lost coverage has little or no effect on its intended use. Note that the top 32 of the mat commonly is placed at the back (opposite the door) of the doghouse 10. The mat 40 includes an electrical cord for heating the mat 20. Non-electrical heating elements could be used, but an electrical heating element is presently considered the most effective method of heating the mat 20. In one embodiment, the covering 22 is made of a fire retardant material. Note that in one embodiment, the width (w) 36 is 10% shorter or less than the radius 26.

Figure 3:
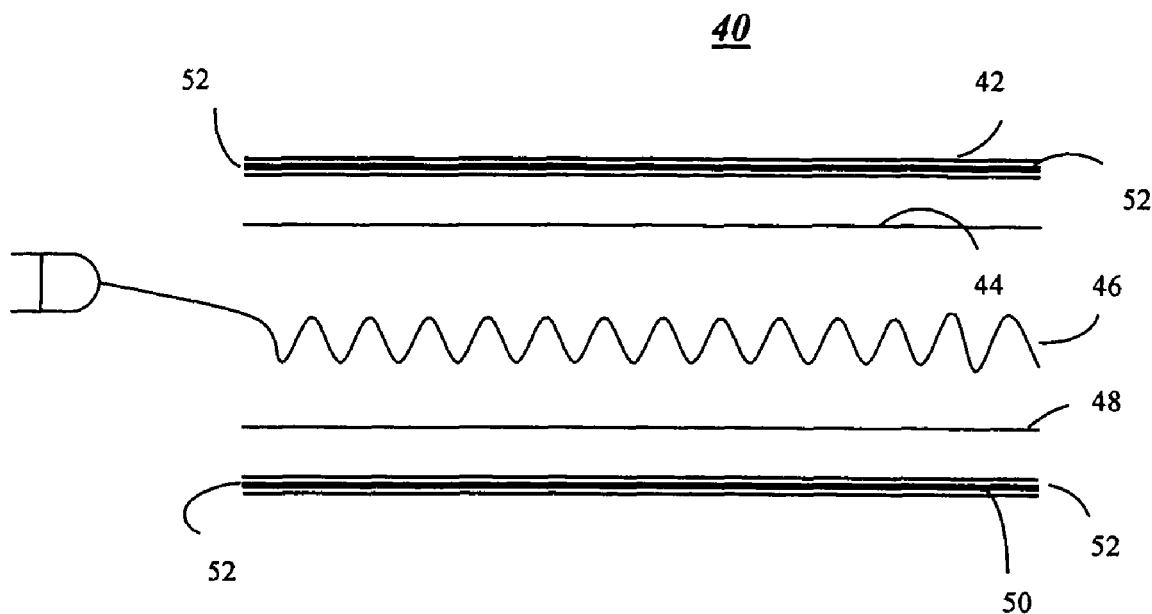
FIG. 3 is an exploded side view of heated pet mat in accordance with one embodiment of the invention.

FIG. 3 is an exploded side view of heated pet mat 40 in accordance with one embodiment of the invention. The mat 40 has a first layer of fire retardant plastic 42. The next layer is a first transfer foil 44. A layer of heating wire 46 is next to the first transfer foil 44. The transfer foil 44 distributes the heat from the heating wire 46 and radiates the heat out through the cover 42. A second transfer foil 48 is placed on the other side of the heating element 46. A second layer of fire retardant plastic 50 is placed against the second transfer foil 48. The edges 52 of the two layers of plastic are sealed together to form a sandwich. In one embodiment, the edges 52 are welded together by RF welding or ultrasonic welding. In one embodiment, the foils 44 & 48 and the heating element 46 have the same approximate shape as the layers 42 & 50. In one embodiment, the plastic layers are made of acrylonitrile butadien styrene (ABS) plastic or polyvinyl chloride (PVC) plastic.

Figure 4:
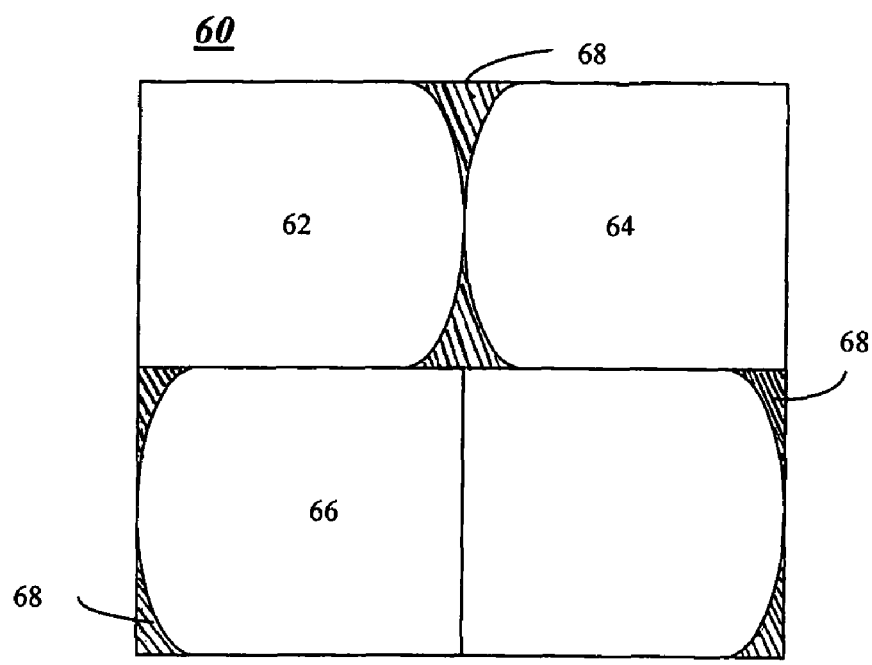
FIG. 4 is an example of a sheet of plastic used in forming the outer layers of a heated pet mat in accordance with one embodiment of the invention.

FIG. 4 is an example of a sheet of plastic 60 used in forming the outer layers of a heated pet mat in accordance with one embodiment of the invention. The sheet of plastic 60 is cut to form either two truncated semicircles 62, 64 or as a truncated circle 66. The truncated circle 66 can be folded to form the two layers of the outer cover of the heated pet mat. The shaded parts 68 of the sheet of plastic 60 are the wasted material. This design significantly reduces the amount of wasted material 68 compared to a full circular design on to full semicircles. This allows the heated pet mat to be produced economically.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A heated pet mat, comprising:
   a first layer of fire retardant plastic in a shape of a truncated semicircle;
   a first transfer foil having approximately a same shape as the first layer of fire retardant plastic adjacent to the first layer of fire retardant plastic;
   a layer of heating wire adjacent to the first transfer foil;
   a second transfer foil having approximately the same shape as the first layer of fire retardant plastic adjacent to the layer of heating wire; and
   a second layer of fire retardant plastic having approximately the same shape as the first layer of fire retardant plastic and sealed along an edge to the first layer of fire retardant plastic and second layer of fire retardant plastic.

2. A method of making a heated pet bed for an igloo shaped doghouse, comprising the steps of:
   defining a truncated circular shape, where a width of the truncated circular shape is less than a length and the length is equal to twice a radius of the truncated circular shape;
   cutting a fire retardant covering into a truncated circular shape;
   forming a heating element into a truncated semicircular shape, the truncated semicircular shape is the truncated circular shape folded in half along the width;
   folding the fire retardant covering in half along the width to form a folded fire retardant covering with an interior;
   placing the heating element into the interior of the folded fire retardant covering; and
   sealing the edges of the folded fire retardant covering.

3. The method of claim 2, wherein the step of defining the truncated circular shape includes the step of selecting a width that is ten percent shorter than the radius.

4. The method of claim 3, wherein the fire retardant material is selected to be acrylonitrile butadiene styrene plastic.

5. A method of making a heated pet bed for an igloo shaped doghouse, comprising the steps of:
   defining a truncated semicircular shape, where a width of the truncated semicircular shape is less than a length and the length is equal to a radius of the truncated circular shape;
   cutting a fire retardant covering into two truncated semicircular shapes;
   forming a heating element into a truncated semicircular shape;
   layering one of fire retardant semicircular shapes, then the heating element and the second of the fire retardant semicircular shapes; and
   sealing the edges of the fire retardant semicircular shapes.

* * * * *